United States Patent [19]
Spariat et al.

[11] Patent Number: 5,136,925
[45] Date of Patent: Aug. 11, 1992

[54] DEVICE FOR TEMPORARY ATTACHMENT OF AN OBJECT TO A SUPPORT DESIGNED TO FRACTURE AT A PREDETERMINED TENSILE LOAD

[75] Inventors: Jacques Spariat, Saint Medard en Jalles; Jean-Pierre Aubret, Bordeaux, both of France

[73] Assignee: Aerospatiale Societe Nationale Industrielle, France

[21] Appl. No.: 689,982

[22] Filed: Apr. 23, 1991

[30] Foreign Application Priority Data

Apr. 27, 1990 [FR] France ................ 90 05449

[51] Int. Cl.⁵ .............................................. F42B 15/36
[52] U.S. Cl. ............................................ 89/1.14; 102/378
[58] Field of Search ........................ 294/82.26, 82.29; 244/137.4; 411/20; 89/1.14; 102/377, 378

[56] References Cited

U.S. PATENT DOCUMENTS

| | | | |
|---|---|---|---|
| 3,104,521 | 9/1963 | Sawyer et al. | 102/378 |
| 3,119,302 | 1/1964 | Barr | 89/1.14 |
| 3,196,745 | 7/1965 | Sustrich et al. | 102/378 |
| 3,262,351 | 7/1966 | Webb | 102/378 |
| 3,530,759 | 9/1970 | Francis | 102/378 |
| 3,887,150 | 6/1975 | Jakobowski | 244/137.4 |
| 3,910,154 | 10/1975 | Gardner | 102/378 |
| 4,002,120 | 1/1977 | Swales et al. | 102/378 |
| 4,064,783 | 12/1977 | Ess | 102/378 |
| 4,171,663 | 10/1979 | Day et al. | 102/377 |
| 4,187,759 | 2/1980 | Toy et al. | 102/378 |
| 4,554,905 | 11/1985 | Smyly et al. | 403/328 |
| 4,625,619 | 12/1986 | Ceniza | 102/378 |
| 4,929,135 | 5/1990 | Delarue et al. | 89/1.14 |

FOREIGN PATENT DOCUMENTS 0131073 1/1985 European Pat. Off.
2616856 12/1988 France.

Primary Examiner—David H. Brown
Attorney, Agent, or Firm—Remy J. VanOphem

[57] ABSTRACT

A device for temporarily attaching an object to a support having a body designed to be fixed to the support and including an annular end portion fixed to the object and joined to the body by a coupling characterized in that the coupling between the annular end portion (3) of the receptacle fixed to the object and the body is flexible and fragile. An intermediate ring is joined to the annular end area and to the body by respective pairs of flexible axial tangs on respective diameters at 90° to each other, the tangs of each pair being identical.

20 Claims, 3 Drawing Sheets

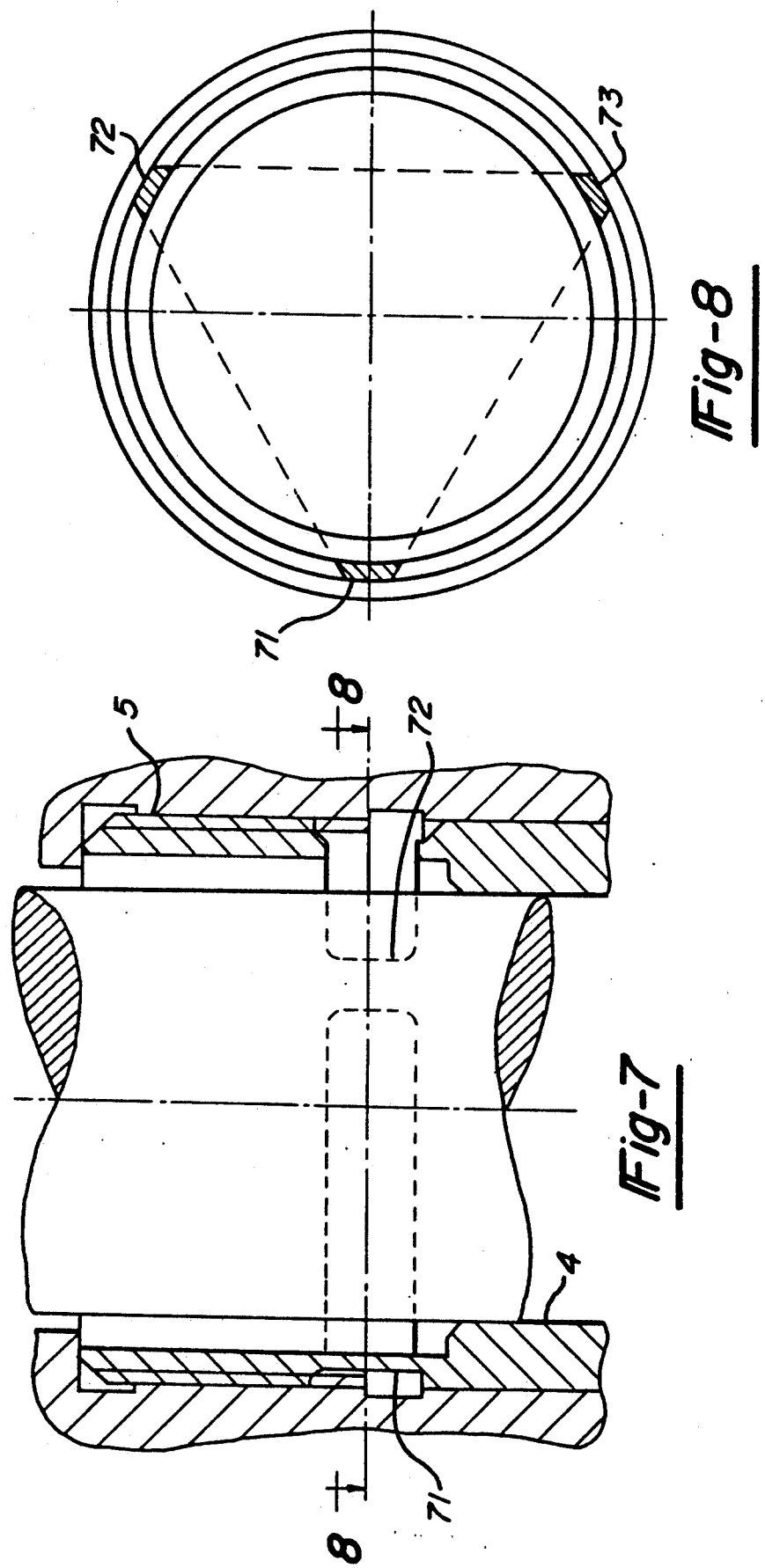

DEVICE FOR TEMPORARY ATTACHMENT OF AN OBJECT TO A SUPPORT DESIGNED TO FRACTURE AT A PREDETERMINED TENSILE LOAD

The invention concerns the temporary attachment of an object to a support, particularly but not exclusively in systems for temporarily attaching an object to its support and separating it therefrom.

It finds an advantageous but by no means exclusive application in spacecraft such as satellites in which a temporary attachment phase is followed by a separation phase, possibly with more or less forcible ejection. It can also find applications in various terrestrial vehicles, maritime vehicles (surface vessels and submarines) and airborne vehicles (aircraft of all kind) in which a temporary connection is made that is to be released subsequently, possibly with immediate and precise movement of the object in question (for example to launch it with no external guidance).

A particular application of the invention is to conducting scientific experiments in the upper atmosphere or to exploring the planets of the solar system using an automatic probe. For example, it can be used to secure and then release or eject a storage vessel containing a chemical substance to be used as a tracer to study winds or magnetic fields; a storage vessel of this kind can be ejected from an artificial platform such as a sounding rocket or an interplanatory probe.

Various mechanisms are already known for providing temporary attachment of this kind followed by separation and more or less forcible ejection, in practice for achieving clean separation between the object and its support.

The following documents are particularly noteworthy in this respect: U.S. Pat. No. 4,554,905, WO-82/02527, U.S. Pat. No. 3,887,150, U.S. Pat. No. 2,888,294, U.S. Pat. No. 3,196,745, U.S. Pat. No. 3,597,919, U.S. Pat. No. 4,002,120, U.S. Pat. No. 4,187,759, FR-2 616 856 and FR-2 616 857.

The temporary attachment of the object to its support is in practice designed to be as stiff as possible, both in traction and in bending.

Some known couplings use pyrotechnic separation: explosive bolts, explosive cutters or pyrotechnic release (unlatching) systems which retract an abutment member. Apart from the fact that they sometimes require a large number of parts, these various solutions always assume release commands separate from the ejection commands. Also, separation can disturb ejection and compromise its accuracy.

Also known are fragile couplings which are fractured by the ejection itself. This is the case with shear pins which are disposed transversely to the direction of ejection and anchored at their respective ends into the object and into the support. The shear pin technique has the following drawbacks, however:

it requires an extremely accurate fit between the moving parts,
  there is a risk of unwanted friction between the parts after the pin fractures,
  there is an additional part (the pin) whose two portions must be held in place after it fractures and which may scrape against the surface of the opposite other part,
  it is difficult to release the object, which is in practice retained by a number of pins, without unbalancing the system (through rotational (tilting) movement in particular).

This solution is complex because it is necessary to manufacture a number of parts and to assemble them in precise relative positions. It is not always reliable.

The invention is directed to alleviating the aforementioned drawbacks.

It has been found that a stiff coupling between the object and its support is not always advantageous and that, to enable ejection in an accurately defined direction with an accurately defined amplitude, it may be advantageous to make the coupling flexible but stiff in traction to enable the orientation of the object relative to the support before and after ejection to be defined only by the rod which applies the ejection thrust.

An object of the invention is, therefore, to provide a simple and reliable temporary attachment device enabling tilting movements of the object relative to its support and incorporating an area designed to fracture at a predetermined traction force. A device of this kind must therefore provide a coupling between two subsystems which is flexible in the storage condition, incorporates an area designed to fracture in response to a controlled energy input and is advantageously adapted to center the object relative to the ejection direction at least locally.

To this end the invention proposes a device for temporarily attaching an object to a support constituting a body designed to be fixed to the support and including an annular end portion fixed to the object and joined to the body by a coupling characterized in that the coupling between the annular end portion fixed to the object and the body is flexible and fragile, and an intermediate ring joined to the annular end area and to the body by respective pairs of flexible axial tangs on respective diameters at 90° to each other, the tangs of each pair being identical.

The central axial opening of the device enables sliding movement of the ejector rod, if any. Alternatively, it can enable the passage of electrical conductors (which are protected by it) or any other kind of connecting or transmission tube or cable that must be protected against relative tilting bending movement of the object and support.

Preferred features according to the invention, some at least of which may be combined with each other are as follows.

The tangs of each pair of flexible axial tangs have the same tensile strength and the tangs of one pair have a lower tensile strength than the tangs of the other pair.

The tangs of each pair have the same tensile strength and tangs joining the intermediate ring to the annular end area have a lower tensile strength than the tangs joining the intermediate ring to the receptacle body.

The tangs of each pair have the same characteristics in bending about the respective diameters.

The tangs of each pair have the same thickness transversely to the respective diameters and the same height parallel to the predetermined direction.

The tangs of each pair have the same radial dimension and the tangs of one pair have a smaller radial dimension than the tangs of the other pair.

The intermediate ring and the tangs are an integral part of a generally cylindrical liner forming part of the body including the annular end portion.

The flexible axial tangs have identical mechanical characteristics, a fragile portion being provided between the annular end area and the pair of flexible axial tangs joining the annular end area to the intermediate ring, the fragile portion including three identical fragile tangs at 120° to each other.

The body is hollow and contains an ejector rod having a rear portion designed to be subjected to ejection pressure and a front end designed to abut against the object.

The device has a spring member compressed axially between a flange inside the body and a bearing surface on the rear portion of the ejector rod to prestress the fragile coupling in traction; in particular, this prevents the attachment of the annular end portion to the object from loosening.

The annular end portion of the receptacle includes an externally screwthreaded portion cooperating with an internal screwthread formed at the mouth of the recess in the object.

The device further includes a centering portion adapted to enter the recess with slight clearance.

Objects, characteristics and advantages of the invention will emerge from the following description given by way of non-limiting example with reference to the drawing appended hereto.

BRIEF DESCRIPTION OF THE DRAWINGS

FIG. 7 is a partial view of an alternative, stiff embodiment of the fragile part of the coupling; and FIG. 8 is a view of this embodiment in cross-section taken along VIII—VIII in FIG. 7.

DETAIL DESCRIPTION OF THE PREFERRED EMBODIMENT

Figure 1:
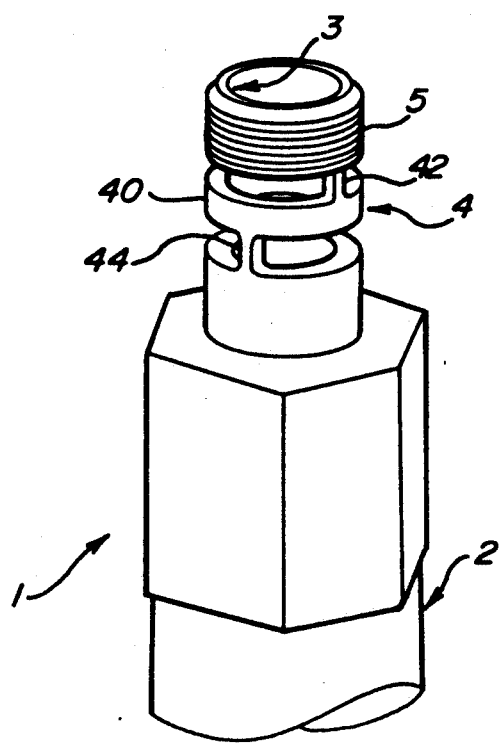
FIG. 1 is a partial view in perspective of a device in accordance with the invention.

FIG. 1 shows a temporary attachment device 1 having a body 2, which in practice is designed to be fixed to a support, and an annular end portion 3 designed to be fixed to an object A to be deployed or ejected (see FIGS. 2 and 3) joined to the body 2 by a flexible coupling portion 4 designed to fracture at a predetermined tensile load.

Figure 2:
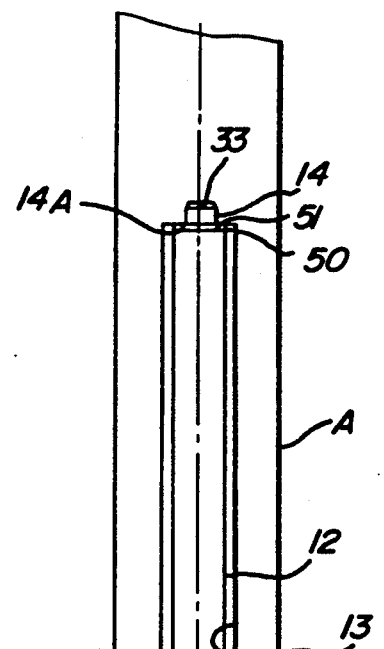
FIG. 2 is a view in axial cross-section of an object attached temporarily by the device and which is designed to be ejected by an ejector rod inserted into the object.
Figure 2:
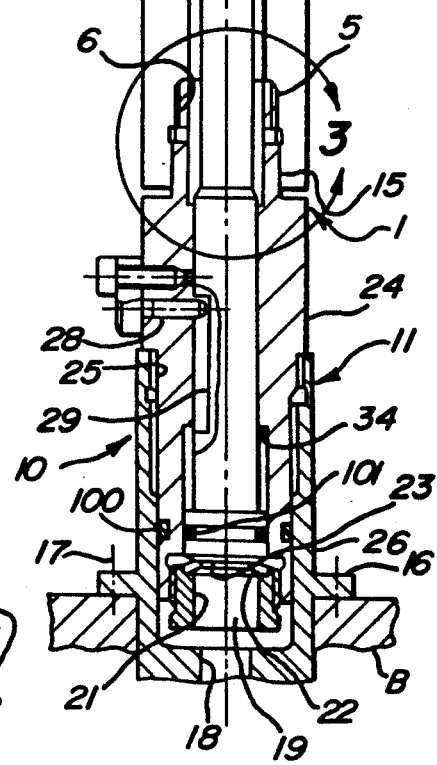
Figure 3:
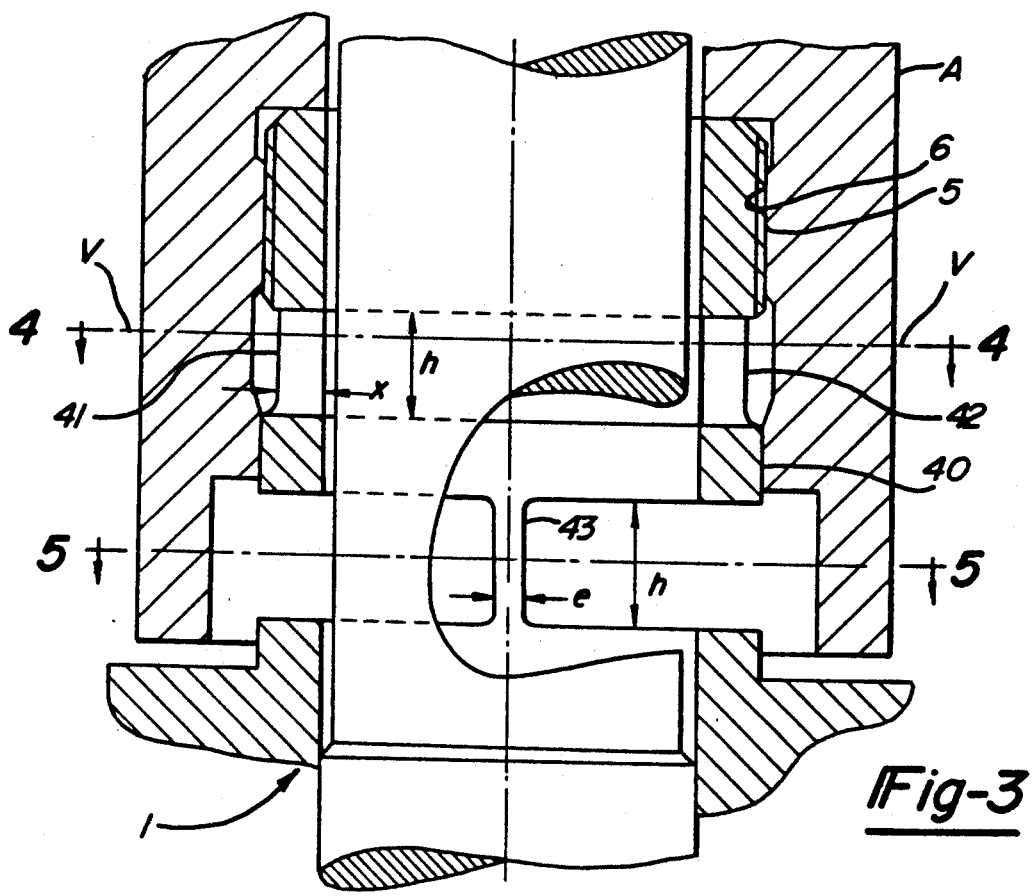
FIG. 3 is a view to a larger scale of the detail indicated generally by arrow in III FIG. 2 showing the portion of the FIG. 1 device which is designed to fracture at a predetermined tensile load.

The end portion 3 in practice incorporates an exterior screwthread 5 designed to be screwed into an interior screwthread 6 in the object A, as shown in FIGS. 2 and 3.

The flexible coupling portion 4 will be described in more detail later with reference to FIGS. 3 through 5.

FIG. 2 illustrates one application of the device 1, showing a mechanism 10 designed to provide the threefold function of temporary attachment in an accurate position, fast separation and controlled ejection of the object A.

The mechanism 10 principally comprised of a generally cylindrical receptacle 11, an ejector rod or piston 12 and an elongate recess 13 in the object A at the bottom of which are a central centering area 14 and a transverse bearing surface 14A and near the mouth of which is a rear end centering area 15.

The receptacle 11 is designed to be fixed to a support B by any appropriate means, for example by a flange 16, as shown in FIG. 2 with apertures 17 through which fixing bolts can be passed.

At the base of the receptacle is a passage 18 communicating with a pressure chamber (not shown) of any appropriate known type fitted in practice with a pyrotechnic type igniter. This passage ends in a chamber 19.

The receptacle has inside it, in the chamber 19, an inwardly projecting flange 21 formed by an initially separate ring attached to it against which a spring member 22 in the form of a Belleville washer or a spiral spring bears in the axial direction. It also bears in the axial direction against a transverse annular bearing surface 23 at the base of the piston.

The inwardly projecting flange 21 is attached to a lining 24 which is screwed by a screwthread 25 into a tubular exterior end piece 26 which with the liner forms the receptacle 11.

O-ring seals 100 and 101 are provided between the end piece and the liner and between the liner and the base of the ejector rod.

A safety pin (not shown) projects radially into the wall of the liner 24. When in place and deployed radially into a transverse bore (not shown) in the rod 12, it prevents unwanted movement of the rod. This pin must of course be retracted radially by any appropriate known means before the object A is ejected.

A rotation guide peg 28 also passes through the wall of the liner 24 into an approximately longitudinal straight or helical groove 29 in the piston with a nonnull angle of inclination relative to the longitudinal axis X—X of the ejector rod. The axial dimension of the groove is at least equal to the axial travel of the ejector rod.

The upper part of the liner 24 ends in the annular end portion 3 which has the exterior screwthread 5 adapted to cooperate with the interior screwthread 6 at the base of the recess 13.

The flexible coupling portion 4 is located between the exterior screwthread portion 5 and the remainder of the liner which with the end piece 26 forms the body of the receptacle.

The ejector rod ends at a peg 33 inserted with little clearance into the central centering area 14.

The sole function of the flexible coupling portion is to retain the object A longitudinally relative to its support, the stiffness of the ejector rod 12 being sufficient to secure the object against transverse forces.

It is even advantageous for this fragile coupling to have low resistance to bending in order to avoid the application of transverse reaction forces to the ejector rod and to avoid tension or compression forces on the parts designed to fracture.

For this reason this portion of the fragile coupling is advantageously designed to be resilient in bending, being a gimbal type device with two transverse rotation axes V—V and W—W at 90° to each other and offset axially relative to each other.

The flexible coupling portion is formed by an intermediate ring 40 respectively joined to the screwthreaded area joined to the object A and to the remainder of the receptacle joined to the support B by two axially offset pairs of tangs 41 and 42, 43 and 44 which are on respective diameters offset angularly at 90°. These spring tangs are machined from the material of the liner.

The tangs are dimensioned according to the maximum predicted transverse movement of the center of mass of the object before or during ejection: their height h (parallel to the X—X axis) and their thickness e (perpendicular to the diameters on which they are disposed) are chosen according to the mechanical characteristics of the material from which they are made, so that they absorb such movement without fracturing and preferably without plastic deformation.

The tangs of the two pairs advantageously have the same behavior in bending (equal bending stresses) for equal transverse displacements of the free end of the rod in two perpendicular radial directions (in practice along the aforementioned diameters).

Those skilled in the art will know how to achieve this condition. If the longitudinal offset between the two pairs of tangs is small in comparison with their distance from the center of mass of the object (as is assumed here), the aforementioned condition is equivalent to stating that the tangs must all have the same bending characteristics, in other words the ratio $e/h^2$ must have the same value for each of them.

In the particularly simple example shown here the tangs advantageously have the same height h and the same thickness e.

However, to ensure that fracture of the fragile coupling does not impart any spurious moment to the object, the tangs of one pair (for example the tangs 41 and 42 nearest the screwthreaded area) preferably have a radial dimension x which is smaller than the radial dimension y of the tangs of the other pair: despite their identical characteristics in bending, a difference in tensile strength is introduced between the two pairs resulting in fracture of the tangs of one pair only.

Figure 4:
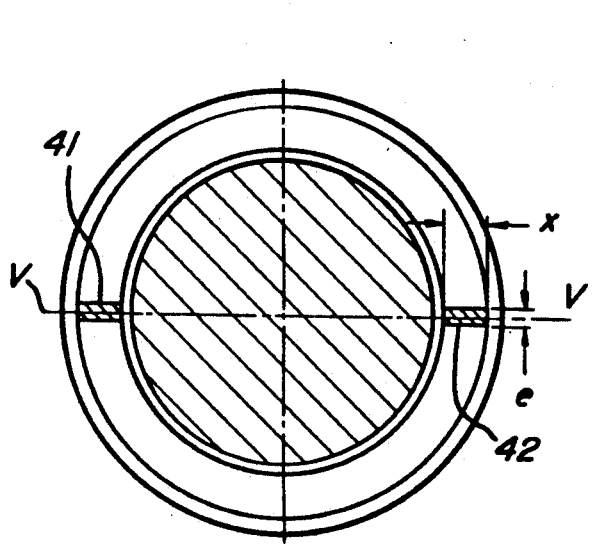
FIGS. 4 and 5 are views in transverse cross-section taken along lines IV—IV and V—V, respectively, in FIG. 3.

Referring to FIG. 4, for example, note that the moment of inertia of the pair of tangs 41 and 42 is greater about the W—W axis than the moment of inertia of the same tangs about the V—V axis on which they are aligned. In this way, because the resisting cross-sections of the tangs are offset between FIGS. 4 and 5, the coupling device has approximately the same flexibility in all directions.

The fragile coupling is designed to fracture at a predetermined tension force between the exterior screwthread 5 and the intermediate ring 40 which in this embodiment centers the end of the object A.

For the tangs to be operative only in flexion before ejection and to be operative only in traction during ejection and to prevent the exterior and interior screwthreads 5 and 6 from becoming unscrewed, the tangs are prestressed by the spring member 22 which urges the ejector rod against the end of the recess 13 and so loads the tangs.

To circumvent geometrical errors of centering of the object by the peg 33 and of the in practice inevitable eccentricity of the center of mass of the object relative to its geometrical axis X—X, it is advantageous for the distance between the point of application of the thrust and the center of mass of the object to be as small as possible and for this to be achieved automatically.

To this end, as shown in FIG. 2, a washer 50 made from a flexible elastomer type material is advantageously disposed axially between a shoulder 51 on the ejector rod near the peg 33 and the traverse bearing surface or shoulder 14A near the central centering area 14; this flexible washer distributes the areas of contact and therefore distributes the ejection thrust over the bottom of the recess as close as possible to the center of mass and ensures that the point of application of the infinitesimal forces is near the center of mass. This washer may be an independent separate part or obtained by overmolding.

It will be understood that the thrust is applied in practice not by the peg itself but by the shoulder 51 around it.

The "ejector mechanism" subassembly is assembled using a jig. The piston is pushed back until the tension spring turns are in contact with each other and the object is then simply screwed onto the subassembly until it reaches the end of the screwthread, without applying any prestressing.

After the position of the object relative to the liner is checked, the piston is released and the spring then prestresses the coupling which also immobilize it against rotation.

This assembly can be performed either by screwing the object to the ejector mechanism or by screwing the ejector mechanism to the object.

The use of the mechanism in accordance with the invention will now be described.

Ejection is commanded, for example, by firing an igniter. Pressurizing the combustion chamber causes the piston to be urged against the object at the top abutment near the center of mass.

First the top two tangs of the gimbal type fragile coupling are broken and then the object is accelerated.

As soon as it begins to move the object quits the bottom centering device, namely the intermediate ring 40, with the result that the only interface between it and the support are the support and centering contact areas near its center of mass.

Note that after the fragile coupling fractures the upper part (the screwthreaded portion) remains attached to the object. The practice its mass is small.

During the linear movement of the piston, the rotational guide peg finger 28 fixed to the liner slides in the helical or straight groove 29 in the latter piston which causes it to rotate. This rotation of the ejected object is obtained by friction at the piston/object interface.

An end of travel abutment 34 stops the movement of the ejector piston. The object is released from its interface with the piston and enters its ballistic phase.

Note that the object/piston combination is such that complete release of the object relative to the piston occurs without contact.

Figure 6:
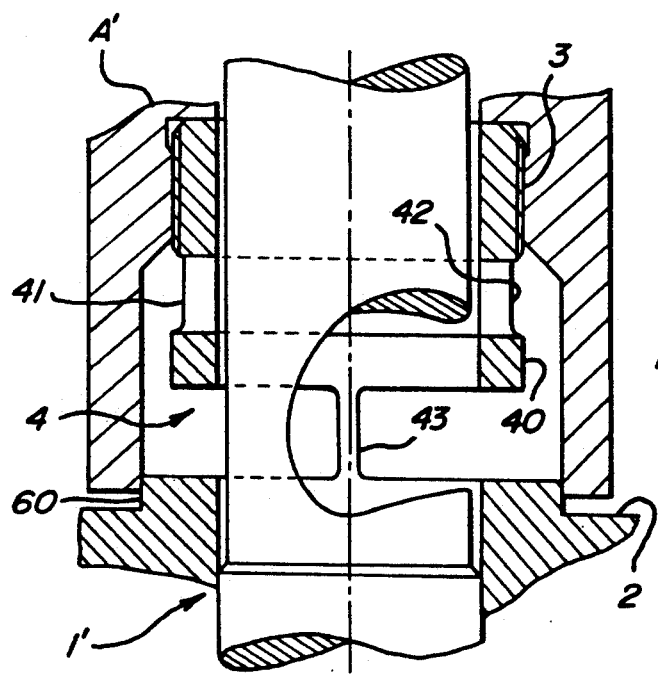
FIG. 6 is a view analogous to that of FIG. 3 showing an alternative embodiment of the arrangement for centering an object fixed to the device of FIG. 1.

FIG. 6 shows an alternative embodiment of the object A' in which the object is centered not by the intermediate ring 40 but by a ring 60 provided between the flexible coupling portion 4 and the body 2.

In a further embodiment, not shown, the ring 60 can be dispensed with if no centering is required.

FIGS. 7 and 8 show another embodiment of the fragile coupling in which the flexibility and fragility functions are separate.

Figure 5:
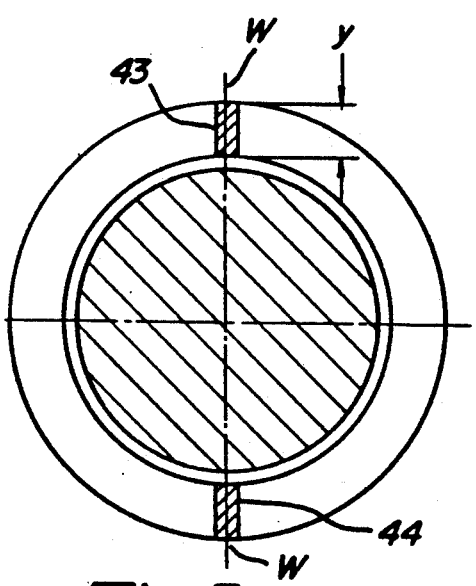

The flexible coupling portion 4 as described with reference to FIGS. 3 through 5 is modified by providing the tangs 41 and 44 with the same mechanical characteristics and providing between the flexible coupling portion 4 and the annular end portion 3 a fragile portion 70 shown separately in FIGS. 7 and 8.

The fragile portion 70 is composed of three identical machined tangs 71, 72 and 73 at 120° to each other, coupling the annular end area 3 to the flexible coupling portion 4.

The tangs preferably have a trapezium-shaped cross-section with sides which are coplanar with the sides of the other tangs, as shown by the three dashed lines in FIG. 8.

It goes without saying that the above description has been given by way of non-limiting example only and that those skilled in the art can put forward numerous variations thereon without departing from the scope of the invention.

We claim:

1. A device for temporarily attaching an object to a support comprising:
   a body mounted to said support, said body having a longitudinal axis;
   an annular end portion attached to said body and secured to said object; and
   a coupling located between said body and said annular end portion for securing said annular end portion to said body, said coupling comprising:
   an intermediate ring having a central axis; and
   at least two axial tangs circumferentially spaced apart and extending longitudinally between said annular end portion and said intermediate ring, each of said at least two axial tangs having one end attached to said annular end portion and an opposite end attached to said intermediate ring.

2. The device according to claim 1 wherein each of said at least two axial tangs has a first predetermined cross-sectional shape whereby when a force is applied to said object in a direction transverse to said central axis the elastic bending characteristics of said at least two axial tangs will be substantially the same.

3. The device according to claim 1 wherein said coupling is integrally formed with said body and said annular end portion so as to define a generally cylindrical member.

4. The device according to claim 1 wherein said at least two axial tangs comprises three axial tangs equally spaced apart circumferentially and having substantially identical tensile strengths, said three axial tangs being a fragile portion provided between said annular end portion and said coupling.

5. The device according to claim 1 further comprising an external helical thread disposed on the peripheral surface of said annular end portion and a complementary internal thread disposed on an internal diameter of said object, said external helical thread cooperating with said internal thread formed in said object to secure said object to said annular end portion.

6. The device according to claim 5 further comprising a centering member extending longitudinally through said body and an elongate recess longitudinally disposed within said object, said centering member being slidably engaged with said elongate recess.

7. The device according to claim 1 wherein said body is hollow.

8. The device according to claim 7 further comprising an ejector rod longitudinally extending through said hollow body, said ejector rod having one end portion disposed within said hollow body for coacting with an ejection pressure and an opposite end portion which extends from said body and abuts said object.

9. The device according to claim 8 further comprising biasing means disposed between said body and said one end portion of said ejector rod, said biasing means biasing said ejector rod in a direction toward said object so as to place said coupling in tension.

10. The device according to claim 1 further comprising at least two additional axial tangs circumferentially spaced apart and extending longitudinally between said intermediate ring and said body, each of said at least two additional axial tangs having one end attached to said intermediate ring and an opposite end attached to said body.

11. The device according to claim 10 wherein said at least two additional axial tangs has a first predetermined cross-sectional shape whereby when a force is applied to said object in a direction transverse to said central axis the elastic bending characteristics of said at least two additional axial tangs will be substantially the same.

12. The device according to claim 10 wherein each of said at least two and said at least two additional axial tangs have substantially equal tensile strength properties.

13. The device according to claim 12 wherein said at least two axial tangs have a lower tensile strength than said at least two additional axial tangs.

14. The device according to claim 1 wherein said at least two axial tangs are mounted between said annular end portion and said intermediate ring diametrically opposed about a first axis substantially transverse to said longitudinal axis.

15. The device according to claim 14 further comprising at least two additional axial tangs circumferentially spaced apart and extending longitudinally between said intermediate ring and said body, each of said at least two additional axial tangs having one end attached to said intermediate ring and an opposite end attached to said body.

16. The device according to claim 15 wherein each of said at least two axial tangs and each of said at least two additional axial tangs have substantially equal radial dimensions.

17. The device according to claim 15 wherein said at least two additional axial tangs are mounted between said intermediate ring and said body diametrically opposed about a second axis, said second axis being transverse to said longitudinal axis and substantially perpendicular to said first axis.

18. The device according to claim 17 wherein each of said at least two and each of said at least two additional axial tangs have substantially equal thicknesses in a direction orthogonal to both said longitudinal axis and wherein each of said at least two axial tangs and each of said at least two additional axial tangs have substantially equal heights in a direction parallel to said longitudinal axis.

19. The device according to claim 17 wherein said at least two axial tangs and said at least two additional axial tangs have substantially equal tensile strength properties.

20. The device according to claim 15 wherein said at least two axial tangs have a smaller radial dimension than said at least two additional axial tangs.

* * * * *

UNITED STATES PATENT AND TRADEMARK OFFICE
CERTIFICATE OF CORRECTION

PATENT NO. : 5,136,925  
DATED : August 11, 1992  
INVENTOR(S) : Spariat et al

It is certified that error appears in the above-identified patent and that said Letters Patent is hereby corrected as shown below:

Column 1, before line 5, insert ---- BACKGROUND OF THE INVENTION ----.

Column 2, before line 8, insert ---- SUMMARY OF THE INVENTION ----.

Column 3, line 23, delete "drawing" and insert ---- drawings ----.

Column 3, line 32, delete "in III" and insert ---- III in ----.

Column 3, line 44, after "along" insert ---- lines ----.

Column 3, line 45, delete "DETAIL" and insert ---- DETAILED ----.

Column 3, line 65, delete "principally comprised" and insert ---- is principally composed ----.

Column 5, line 66, delete "traverse" and insert ---- transverse ----.

Column 6, line 18, delete "immobilize" and insert ---- immobilizes ----.

UNITED STATES PATENT AND TRADEMARK OFFICE
CERTIFICATE OF CORRECTION

PATENT NO. : 5,136,925

DATED : August 11, 1992

INVENTOR(S) : Spariat et al

It is certified that error appears in the above-identified patent and that said Letters Patent is hereby corrected as shown below:

Column 6, line 38, delete "The" and insert ---- In ----.

Column 6, line 41, delete "latter".

Signed and Sealed this

Twenty-eighth Day of December, 1993

Attest:

BRUCE LEHMAN

Attesting Officer

Commissioner of Patents and Trademarks